June 23, 1931. O. E. NOBLE 1,810,981
ADJUSTABLE SCREEN INTAKE
Filed Sept. 6, 1929

INVENTOR
Oliver E. Noble
BY Loyal J. Miller
ATTORNEY

Patented June 23, 1931

1,810,981

UNITED STATES PATENT OFFICE

OLIVER E. NOBLE, OF OKLAHOMA CITY, OKLAHOMA

ADJUSTABLE SCREEN INTAKE

Application filed September 6, 1929. Serial No. 390,830.

My invention relates to adjustable screen intakes for water supply systems.

The objects of my invention are to provide a device of this class which will be new, novel, practical and of utility; which will permit the flow of water into an intake well from a point adjacent the surface of the water supply; which will screen from the water received, all fish and floating foreign matter usual to such water surfaces; which will aerate the water received; which will be adjustable as to the amount of water received and as to the level of the receiving screen; which is primarily adapted to take water from a short distance below the water level; which may easily be adjusted to such receiving position; which will be relatively inexpensive to manufacture and to install; which will be easy of access for cleaning and for repair; which will be efficient in accomplishing all the purposes for which it is intended.

For a number of reasons obvious to those familiar with conditions present in removing water from an open surface source of supply, it is deemed best to secure such water as is needed from adjacent the surface of the supply, rather than from lower levels thereof. Insofar as this applicant knows or can ascertain no practical means of receiving and screening such water has been devised heretofore which is readily adjustable to various levels and which may easily be cleaned.

The usual means for choosing the level from which the supply will be taken, is the provision in the intake well of a number of screened apertures therethrough, one above another. Such apertures are provided with shutters of one kind or another for closing such as are desired, and for permitting the flow of supply water into the well through such shutters as are left open. Such shutters must of necessity be opened and closed under water and the screens of the apertures under water must frequently be cleaned from the accumulation of foreign matter deposited thereupon.

My device provides a means whereby the water may be taken from the depth desired and may be adjusted so to do without the attendant at any time entering the water, moreover, the screen of the device may be raised high and dry for cleaning and for the removal of accumulated flotsam.

With these and other objects in view as will more fully appear, my invention consists in the construction, novel features, and combination of parts hereinafter more fully described, pointed out in the claims hereto appended, and illustrated in the accompanying one-sheet drawings, of which, Figure 1 is a plan view of my device, showing a portion of one of the intake pipes and a portion of the intake well broken away.

Like characters of reference designate like parts in all the figures.

Figure 1:
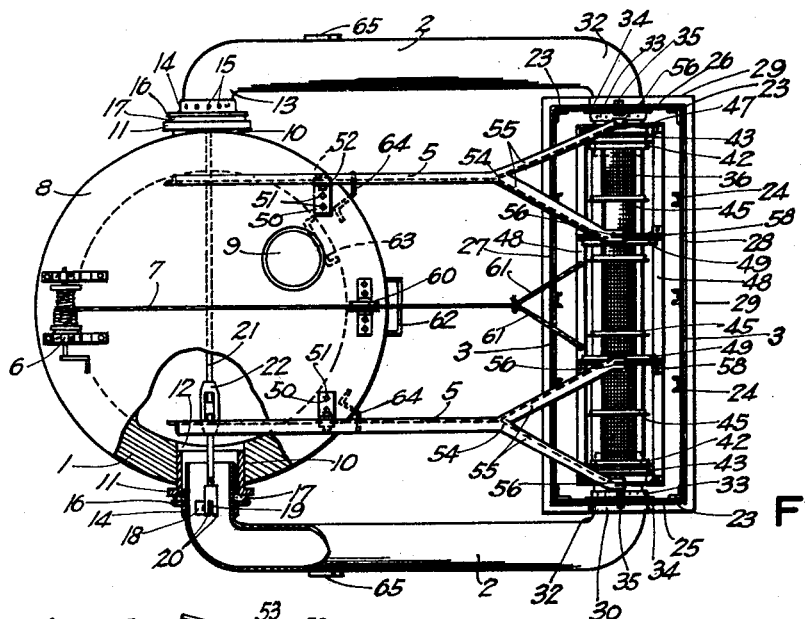

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

A practical embodiment of the invention as illustrated in the drawings comprises:

The usual intake well 1, positioned, as is customary, within the confines of the water supply body, is fed by a pair of oppositely disposed adjustable intake pipes each of which is indicated by the numeral 2. These pipes 2 lead to the box 1 from my screen box 3 which may be adjusted as to its relative proximity to the surface of the water 4 by a plurality of adjusting arms 5, and raised or lowered to the desired position by a usual winch 6 and cable 7. The said box 3 is provided with a cylindrical screen 36.

The intake well 1, as illustrated herewith, is cylindrical in form and is constructed of concrete, but neither of these details as to form or composition of the well, is essential. In the form shown, the well is provided with a circular lid or top 8, which also is preferably of concrete, and which is provided with a manhole 9.

At each diametrically opposite side below the estimated low water level of the source of supply, the well 1 is provided with a sleeve 10, ordinarily of cast metal, and these sleeves are securely set into the walls of the well 1 through apertures, therethrough shown as 12. Each of said sleeves 10, upon its end external to said well, is provided with an annular radial flange 11.

Each of said intake pipes 2 is provided integrally with a right angle L 13, the end of which is disposed within the said sleeve 10 in a manner permitting the rotation of the L therein. Said L's 13 are each provided with a collar 14 secured thereto by brazing, riveting or the like, and the said collars are annularly and radially flanged as shown at 16. Said flanges 16 and 11 together with gaskets 17, therebetween, provide water tight joints between the said L's 13 and sleeves 10, while permitting the rotation of one within the other.

Within each of said L's 13 and riveted to opposite walls thereof are the flanged ends 18 of a cross-bar 19. Each cross bar 19 is embraced at its mid-section by the limbs 20 of the bifurcate turnbuckle rod 21, upon which is the turnbuckle 22. A pin passes through alined perforations in limbs 20 and bar 19. By means of turnbuckle 22, rod 21 and cross bars 19 the flanges 16 may be drawn tightly or loosened upon the gaskets 17 and flanges 11 of the sleeves 10. Thus the opposing L's 13 and pipes 2 will be secured in their proper relation to said well 1, or may be removed therefrom as desired.

The said screen box 3 is rectangular in form, is bottomless and may or may not be provided with a cover. The material of the box is preferably of sheet metal and for greater strength and rigidity it is provided interiorly with vertical angle iron corner pieces 23 and a plurality of channel iron ribs 24. For convenience in description, the ends of the screen box are numbered 25 and 26, respectively, and its sides are shown as 27 and 28.

An angle iron re-inforcing band 29 is riveted about the exterior of the box 3 and at the said box ends 25 and 26, said angle iron is curved to form the upper half of a circle the diameter of which is slightly in excess of the outer diameter of the said pipe 2. These semi-circular portions 30 each have a plurality of perforations as shown at 31 for a purpose presently to appear.

Projecting into the box 3 through circular apertures, not shown, in the said ends 25 and 26, respectively, are the L's 32 of pipes 2, similar in shape to the said L's 13 upon the opposite ends of said pipes. Upon each of said L's 32, adjacent the interior of the said end walls 25 and 26, respectively, is riveted or otherwise rigidly secured the collar 33 having a radial annular flange 34. Said flanges 34 and each of said box ends 25 and 26 have spaced perforations, not shown, laterally therethrough adapted to aline with the similarly spaced said perforations 31. A removable pin 35 through the desired perforation 31 and through the desired alined perforations in the respective box ends 25 and 26, and the respective flanges 34 will permit the positional adjustment of the said box 3 in its relation to said L's 32, in such a manner that said box 3 may retain an approximately horizontal position, regardless of the angle thereto of the said pipes 2.

Within the said box 3 I provide the said screen 36, cylindrical in form which at its opposite end portions overlaps and is supported by the end portions of the said L's 32, fitting tightly thereabout.

Figure 3:
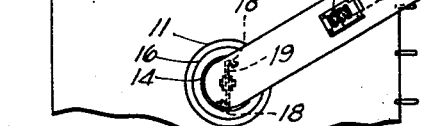
Figure 3 is an end sectional view of the screen box, the screen, and the telescoping shutter members, together with a fragmentary part of one of the inlet pipes.
Figure 4:
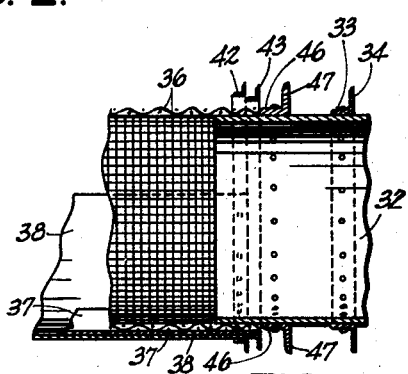
Figure 4 is a fragmentary side view of the screen and telescoping shutter members.

Devised to regulate the quantity of the flow of water to the screen 36, I provide a pair of shutters shown as 37 and 38, respectively. Each of shutters 37 and 38 are of sheet metal, are of a length approximating that of the said screen 36, and are cupped to conform somewhat closely to the cylindrical shape of the screen, each being transversely somewhat less than a half-cylinder. Said shutter 37 lies closely, but slidably, adjacent the exterior of screen 36, while a portion of the shutter 38 laps closely but slidably over a bottom portion of said shutter 37. This is best shown in Fig. 3. Said shutters adjustably control the water flow to said screen 36 by widening or narrowing the opening shown as 39 between the upper edge 40 of the shutter 38 and the upper edge 41 of the shutter 37. This is accomplished by operating said shutters 37 and 38 slidably and axially one within the other. In order conveniently to operate said shutters and at the same time strengthen and give them greater rigidity, I provide each end of the said shutter 38 with an annular collar radially flanged as shown at 42, while the ends of shutter 37 which overhang the ends of shutter 38 are provided each with a similar collar radially flanged as shown at 43. Said flanges 43 are each provided with a plurality of spaced lateral perforations, shown as 44, adapted to aline with like spaced perforations, not shown, through each of said flanges 42. A small cylindrical rod if passed through one of said perforations 44 and into one of said opposite perforations in said flange 42 will operate as a lever having for its fulcrum a right or left edge, as desired, of one of the chosen perforations 44, and if swung to the right will widen the said opening 39, and if swung to the left will narrow the said opening. The operation may be repeated by using other alined perforations to further open said shutters, or by a reverse movement said shutters may be more nearly closed. It is to be understood that the collars having said flanges 42 and 43 are rigidly attached by brazing, riveting or the like to the respective shutters 37 and 38 upon which they are disposed. The friction between said shutters 37 and 38 will usually be sufficient to prevent any undesired movement thereof, but if desired a locking means therefor may be had by passing a removable bolt through an alined pair of said perforations in the flanges 42 and 43.

Spaced at regular intervals and loosely encircling the said shutters 37 and 38 and the open top of the screen 36 I provide a plurality of collars or bands 45.

Each of said L's 32 is provided within the box 3, between the collar 33 and the adjacent end of the said shutters 37 with a collar 46 riveted or otherwise securely attached to said L, and these collars each are provided with an annular radial flange 47.

As a means for preventing the spreading apart of the two said L's 32, and for providing for their uniformity of movement in the raising and lowering of same, I provide a cage comprising a plurality of longitudinal members 48 of angle iron, and a plurality of transverse circular members 49 which will be hereinafter described.

Each of said members 48 extends lengthwise of the said box 3 and screen 36, and is secured rigidly by any usual means, at each end portion to the rim of one of the said radial flanges 47. In the embodiment of my device as shown herewith are four of these longitudinal members 48 equidistantly spaced. Between the said collar 46 upon the end portion of one of said L's 32 and like said collar 46 upon the opposite said L 32, are provided the two said transverse members 49. Each member 49 is of angle iron or the like and comprises a circle having 4 segmental sections, each section brazed, riveted, welded or otherwise rigidly secured at each end to one of the four said longitudinal members 48.

Oppositely and alinedly disposed upon a forward portion of the top of the lid 8 are a pair of brackets 50, secured by bolts 51, each said bracket provided with a laterally perforated upstanding lug 52. Said lugs 52 form the pivotal holding means for the two said adjusting arms 5. Adjusting arms 5 are of angle iron or the like, are transversely perforated plurally as shown at 53 and at a point adjacent the said screen box 3 are bifurcated as shown at 54. The limbs 55, outspread at an angle from said bifurcation 54 and at their extremities are each bifurcated as shown at 56. The perforated limbs of the bifurcations 56 embrace pivotally and alinedly the perforated angles 57 of the strap iron members 58. Each of said strap iron members 58, best shown in Fig. 3 is alinedly secured at its flanged ends by bolts or the like to the oppositely disposed top pair of said longitudinal cage members 48. Pivot pins through the limbs of the said bifurcations 56 and through the perforated angle 57 secure arms 5 to members 58. It will be obvious that said members 58, and consequently the whole of said screen box 3 may be adjustably positioned by use of the desired said alined perforations 53 in the adjusting arm 5, through means of the removable pivot pins 59 therethrough and through said lugs 52.

The said cable 7 leading from the said winch 6 passes over a usual sheave 60 on the forward portion of said lid 8 and its spreading strands 61 are each at an end portion secured to one of said longitudinal members 48. Said winch and cable members provide a ready means for both raising and lowering said screen box.

Exterior to said intake well 1 are disposed the usual ladder stirrups 62, while interiorly are the stirrups 63.

At 64 may be seen a plurality of L-head bolts alined in vertical rows and protruding from said intake well 1. Should it be desired to position said screen box 3 at a level lower than might be permitted by the position of said arms 5 upon said lugs 57, said arms 5 through their endmost perforations 53 may be secured to a desired and alined pair of said bolts 64. At 65 in Fig. 2 is shown screened openings in said pipes 2 for permitting the intake of water when screen 36 has been raised above the water level for repair or cleansing.

It will be understood that only one of said openings 12 may be provided and that said L's 13 might be pivoted to the opposite ends of a pipe T entering said opening, without departing from the principle of my invention.

Figure 2:
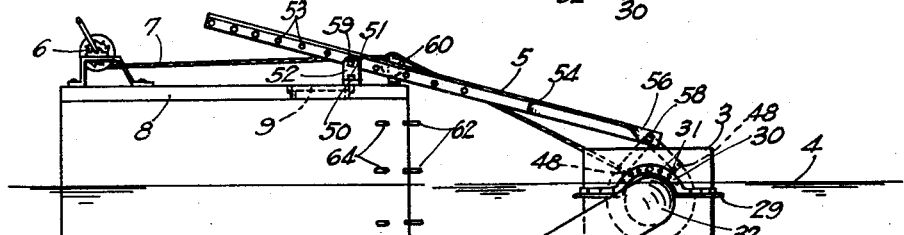
Figure 2 is an elevational view of the device disposed upon the usual intake well.

In operation, the preferred position of the screen box will be as shown in Figs. 2 and 3, the metal sides projecting above the surface of the water, the shutter opening 39, extending slightly below the water level. In this position, water is admitted only through the open bottom of the box, from whence it rises to pour over the tops of the shutters 37 and 38. Because the combined carrying capacity of the pipes 2 is larger than the inlet capacity of shutter opening, the incoming water will be drained rapidly from within the screen box and the fall of the water as shown in Fig. 3 from the shutter tops will operate as an aerating feature. A further aeration of the water is secured by the fall of the water from the said lower L's 13, through the apertures 12, to the bottom of the intake box 1, as the draining capacity of said box 1 will be somewhat larger than the regulated intake capacity of the screen box.

Removal of the pins 59 in arms 5 will permit the raising and lowering of the screen box by means of the winch and cable as heretofore described.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device other than as herein described as fairly fall within the scope of my invention.

Having thus described my invention what is claimed and desired to be secured by Letters Patent, is:

1. In a device, as described, the combination with a closed topped intake well disposed in a water reservoir, said well having opposite side intake openings, a pair of parallel pipe members one end of each pivotally mounted in one of said openings, their free end portions curved inwardly toward each other, of a screen supported therebetween, an open bottomed skimmer box disposed upon said free end portions about said screen, means within said skimmer box for regulating the flow of water to said screen, means for clamping said pipe members in said openings, and strut means for holding said skimmer box and screen rigidly at a desired height.

2. In a device, as described, the combination with a closed topped intake well disposed in a water reservoir, said well having opposite side intake openings, a pair of parallel pipe members one end of each pivotally mounted in one of said openings, their free end portions curved inwardly toward each other, of a cylindrical screen rigidly supported between said free ends, an open bottomed skimmer box disposed upon said free end portions about said screen, means within said skimmer box for regulating the flow of water to said screen, said intake well having means for adjusting the height of said skimmer box and screen, and strut means for holding said skimmer box and screen rigidly at a desired height.

3. In a device, as described, the combination with a stationary intake well disposed upon the bottom of a water reservoir and extending above the high level of the water in said reservoir, said well having a closed top and side intake openings, a pair of parallel intake pipe members one end of each pivotally mounted in one of said openings, said ends having a turnbuckle therebetween for clamping them within said openings, the free end portions of said pipe members curved inwardly toward each other, of a cylindrical screen supported between said free end portions, an open bottomed skimmer box pivotally disposed upon said pipe members about said screen, a pair of slidable shutters within said skimmer box and about said screen for regulating the flow of water to said screen, and arm means for rigidly holding said skimmer and screen at a desired adjusted height.

4. A screen for reservoir intake pipes, embodying a cylindrical screen attached to an intake pipe, an open bottomed skimmer box pivotally disposed upon said pipe and about said screen, and a pair of slidable arcuate shutters within said box and about said screen for regulating the flow of water to said screen.

5. A screen for reservoir intake pipes, embodying a cylindrical screen attached to an intake pipe, an open bottomed skimmer box pivotally disposed upon said pipe and about said screen, a pair of slidable arcuate shutters within said box and about said screen for regulating the flow of water to said screen, and means carried by said box for confining the movement of said box to travel in a single plane.

OLIVER E. NOBLE.